(12) United States Patent
Sloma et al.

(10) Patent No.: US 8,996,700 B2
(45) Date of Patent: Mar. 31, 2015

(54) AUTOMATED WORKLOAD PERFORMANCE AND AVAILABILITY OPTIMIZATION BASED ON HARDWARE AFFINITY

(75) Inventors: Andrew J. Sloma, New Braunfels, TX (US); Jonathan L. Triebenbach, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 312 days.

(21) Appl. No.: 13/248,101

(22) Filed: Sep. 29, 2011

(65) Prior Publication Data

US 2013/0086593 A1    Apr. 4, 2013

(51) Int. Cl.
| G06F 15/173 | (2006.01) |
| G06F 15/16 | (2006.01) |
| G06F 9/46 | (2006.01) |
| G06F 3/00 | (2006.01) |
| G06F 13/00 | (2006.01) |
| G06F 9/50 | (2006.01) |

(52) U.S. Cl.
CPC .............. *G06F 9/5033* (2013.01); *G06F 9/505* (2013.01)
USPC ........... 709/226; 709/217; 718/102; 718/104; 710/17; 710/38; 710/104

(58) Field of Classification Search
None
See application file for complete search history.

(56) References Cited

U.S. PATENT DOCUMENTS

| 6,598,097 | B1 * | 7/2003 | Daniels et al. ............... 710/22 |
| 7,050,807 | B1 | 5/2006 | Osborn |
| 7,552,438 | B1 * | 6/2009 | Werme et al. ................. 718/104 |
| 7,577,813 | B2 * | 8/2009 | Nijhawan et al. ............. 711/170 |
| 2004/0024870 | A1 * | 2/2004 | Hirata et al. ................. 709/224 |
| 2004/0249743 | A1 | 12/2004 | Virginas et al. |
| 2006/0129899 | A1 | 6/2006 | Cochran et al. |
| 2007/0098014 | A1 | 5/2007 | Pomaranski et al. |
| 2009/0182865 | A1 | 7/2009 | Karpuram |
| 2009/0248937 | A1 | 10/2009 | Solomon et al. |
| 2009/0276773 | A1 | 11/2009 | Brown et al. |
| 2009/0313391 | A1 | 12/2009 | Watanabe |
| 2010/0014526 | A1 | 1/2010 | Chavan et al. |
| 2010/0019576 | A1 | 1/2010 | Buterbaugh et al. |
| 2010/0082874 | A1 | 4/2010 | Baba et al. |
| 2010/0095310 | A1 | 4/2010 | Oshins |
| 2010/0180274 | A1 | 7/2010 | Cherian et al. |
| 2010/0299674 | A1 | 11/2010 | Wang et al. |
| 2011/0047271 | A1 | 2/2011 | Guibe et al. |
| 2011/0090751 | A1 | 4/2011 | Manna et al. |

(Continued)

OTHER PUBLICATIONS

U.S. Appl. No. 13/248,108 entitled, "Automated High Resiliency System Pool" filed Sep. 29, 2011 by Andrew J. Sloma et al.

(Continued)

*Primary Examiner* — Lewis A Bullock, Jr.
*Assistant Examiner* — Melissa Alfred
(74) *Attorney, Agent, or Firm* — Wood, Herron & Evans, LLP (57) ABSTRACT

A method, apparatus, and program product deploy a workload on a host within a computer system having a plurality of hosts. Different hosts may be physically located in proximity to different resources, such as storage and network I/O modules, and therefore exhibit different latency when accessing the resources required by the workload. Eligible hosts within the system are evaluated for their capacity to take on a given workload, then scored on the basis of their proximity to the resources required by the workload. The workload is deployed on a host having sufficient capacity to run it, as well as a high affinity score.

25 Claims, 5 Drawing Sheets

(56) References Cited

U.S. PATENT DOCUMENTS

| | | |
|---|---|---|
| 2011/0106950 A1 | 5/2011 | Schlack |
| 2011/0179319 A1 | 7/2011 | Parker et al. |
| 2012/0030318 A1 | 2/2012 | Ryder |
| 2012/0030343 A1 | 2/2012 | Ryder |
| 2012/0066390 A1 | 3/2012 | Salsbery et al. |
| 2012/0066391 A1 | 3/2012 | Gargash et al. |
| 2012/0084261 A1 | 4/2012 | Parab |
| 2012/0096297 A1 | 4/2012 | Archibald et al. |

OTHER PUBLICATIONS

U.S. Patent and Trademark Office, Office Action issued in related U.S. Appl. No. 13/248,108, dated May 8, 2013.

U.S. Patent and Trademark Office, Office Action issued in related U.S. Appl. No. 13/248,108, dated Mar. 13, 2014.

U.S. Patent and Trademark Office, Final Office Action issued in related U.S. Appl. No. 13/248,108, dated Nov. 21, 2013.

* cited by examiner

| Host Number | IO Number | Affinity Score | Notes |
|---|---|---|---|
| Chassis 1 - Host 1 | 1 | 3 | Local storage module |
| | 2 | 3 | Local network module |
| | 3 | 2 | IO-3 in same super-node |
| | 4 | 0 | IO-4 not connected to WAN |
| | 5 | 0 | IO-5 not connected to SAN-1 |
| | 6 | 1 | IO-6 in dispersed node |
| | | 9 (TOTAL) | |
| Chassis 1 - Host 2 | 1 | 3 | Local storage module |
| | 2 | 3 | Local network module |
| | 3 | 2 | IO-3 in same super-node |
| | 4 | 0 | IO-4 not connected to WAN |
| | 5 | 0 | IO-5 not connected to SAN-1 |
| | 6 | 1 | IO-6 in dispersed node |
| | | 9 (TOTAL) | |
| Chassis 2 - Host 15 | 1 | 2 | IO-1 in same super-node |
| | 2 | 2 | IO-2 in same super-node |
| | 3 | 3 | Local storage module |
| | 4 | 0 | IO-4 not connected to WAN |
| | 5 | 0 | IO-5 not connected to SAN-1 |
| | 6 | 1 | IO-6 in dispersed node |
| | | 8 (TOTAL) | |
| Chassis 2 - Host 16 | 1 | 2 | IO-1 in same super-node |
| | 2 | 2 | IO-2 in same super-node |
| | 3 | 3 | Local storage module |
| | 4 | 0 | IO-4 not connected to WAN |
| | 5 | 0 | IO-5 not connected to SAN-1 |
| | 6 | 1 | IO-6 in dispersed node |
| | | 8 (TOTAL) | |
| Chassis 3 - Host 29 | 1 | 1 | IO-1 in dispersed node |
| | 2 | 1 | IO-2 in dispersed node |
| | 3 | 1 | IO-3 in dispersed node |
| | 4 | 0 | IO-4 not connected to WAN |
| | 5 | 0 | IO-5 not connected to SAN-1 |
| | 6 | 3 | Local network module |
| | | 6 (TOTAL) | |
| Chassis 3 - Host 30 | 1 | 1 | IO-1 in dispersed node |
| | 2 | 1 | IO-2 in dispersed node |
| | 3 | 1 | IO-3 in dispersed node |
| | 4 | 0 | IO-4 not connected to WAN |
| | 5 | 0 | IO-5 not connected to SAN-1 |
| | 6 | 3 | Local network module |
| | | 6 (TOTAL) | |

FIG. 6

AUTOMATED WORKLOAD PERFORMANCE AND AVAILABILITY OPTIMIZATION BASED ON HARDWARE AFFINITY

FIELD OF THE INVENTION

The present invention relates to computing systems, and more particularly to allocating a workload between different cores of a computing system of the type that includes a plurality of computing cores.

BACKGROUND OF THE INVENTION

Computing system technology has advanced at a remarkable pace recently, with each subsequent generation of computing system increasing in performance, functionality, and storage capacity, often at reduced cost. However, individual computing systems are still generally expensive and incapable of providing the raw computing power that is often required by modern requirements. One particular type of computing system architecture that generally fills this requirement is that of a parallel processing computing system.

Generally, a parallel processing computing system comprises a plurality of computing cores and is configured with one or more distributed applications. Some parallel processing computing systems, which may also be referred to as massively parallel processing computing systems, may have hundreds or thousands of individual computing cores, and provide supercomputer class performance. Each computing core is typically of modest computing power and generally includes one or more processing units. Each computing core may be incorporated into a dedicated processing node, or each computing core may be a computing system. A distributed application provides work for each computing core and is operable to control the workload of the parallel processing computing system. Generally speaking, a distributed application provides the parallel processing computing system with a workload can be divided into a plurality of tasks. Each computing node is typically configured to process one or more tasks. However, each task is typically further divided into one or more execution contexts, where each computing core of each computing node is typically configured to process one execution context and therefore process, or perform, a specific function. Thus, the parallel processing architecture enables the parallel processing computing system to receive a workload, then configure the computing cores to cooperatively perform one or more tasks and/or configure computing cores to each process one execution context such that the workload supplied by the distributed application is processed.

Parallel processing computing systems have found application in numerous different computing scenarios, particularly those requiring high performance and fault tolerance. For instance, airlines rely on parallel processing to process customer information, forecast demand, and decide what fares to charge. The medical community uses parallel processing computing systems to analyze magnetic resonance images and to study models of bone implant systems. As such, parallel processing computing systems typically perform most efficiently on work that contains several computations that can be performed at once, as opposed to work that must be performed serially. The overall performance of the parallel processing computing system is increased because multiple computing cores can handle a larger number of tasks in parallel than could a single computing system. Other advantages of some parallel processing systems include their scalable nature, their modular nature, and their improved level of redundancy.

Resources in a parallel processing computing system are often configured in a hierarchical fashion, with several processing units disposed within a chassis, several chassis disposed within a super-node, and several super-nodes comprising the distributed computing system. In one embodiment of a blade computing system, each computer host, or blade, includes memory and a processor but does not include dedicated I/O modules. Instead, the entire set of hosts within the chassis share a common set of I/O modules, providing a modular approach to computing by separating out the I/O modules from the CPU. Using this approach, racks of blades can potentially access multiple I/O modules if a physical connection can be made from the blade to the I/O device. This is possible because of new I/O virtualization technologies like Single Root IO Virtualization (SRIOV) and Multi Root IO Virtualization (MRIOV) which allow a single PCI Express adapter to be virtualized and shared by a single host (SRIOV) or multiple hosts (MRIOV) and the Virtual Machines (VMs) running on these hosts. In effect this creates an environment where VMs (workloads) and their PCIe resources can be re-allocated to different PCIe adapters much easier than in the past.

This type of system provides some unique challenges for determining what host a workload should run on to best take advantage of the available I/O resources. For example, consider a workload that requires one storage resource and one network adapter that may be executed in an exemplary system having 32 hosts, representing eight blades each on four chassis, each with enough capacity to handle the workload. Each of the four chassis in such a system may have, for example, three PCIe devices (twelve in total) also available to any of the hosts through a chassis interconnect fabric using MRIOV technology. Some of the twelve I/O modules may have connections to the IO needed by the workload while others may not.

Conventionally, in order to properly place the workload, an administrator typically must manually determine which I/O device will perform the best for a given host, a task that requires specific expertise and understanding of the configuration of the underlying system on the part of the administrator. Furthermore, this determination is often made more difficult when the I/O device's physical location is abstracted away through virtualization, since the administrator may not be able to readily ascertain where in a particular system each host and I/O device is physically located.

Often, it is desirable for performance reasons that a host of a particular workload be as physically close as possible to the I/O devices the workload needs. An I/O device that is in the same chassis as a host will typically require fewer relays than an I/O device that is outside the chassis, and thus, co-locating a workload in a host that is in the same chassis as a needed I/O device will generally lead to better performance. Often, the administrator in such a situation would have to figure out how the virtualized I/O devices map to the underlying physical I/O device, and then understand the end-to-end physical connections from the host to the I/O device to understand the affinity to the host in question.

Furthermore, from a high availability (HA) perspective, understanding the affinity of a given I/O device to a host is also important. For example, if one chassis contains two available I/O devices, while another contains one available I/O device, and it is desirable to ensure I/O high availability and redundancy in the case of the I/O device faulting out, the HA workload would be best suited for placement on the former chassis over the latter. Once again, a manual approach would require the administrator to understand the underlying physical I/O device and its connection topology in relation to each of the hosts. This manual approach is therefore untimely, laborious, and prone to errors.

Consequently, there is a continuing need to automate workload allocation tasks in such a manner that each task is hosted as close to its required resources as possible, thereby minimizing latency and maximizing performance.

SUMMARY OF THE INVENTION

Embodiments of the invention provide for a method, apparatus, and program product to address the optimal deployment of a workload between hosts having different proximity to hardware resources. As such, embodiments of the invention provide a method, apparatus, and program product to optimize workload performance and availability by determining the proximity of each host to the resources required by a given workload, and deploying a workload on one or more hosts close to the resources that the workload requires.

In one embodiment consistent with aspects of the invention, the workload allocation problem is addressed by a method of performing a task in a computing system that includes a plurality of nodes, each node including a plurality of chassis, each chassis including a plurality of processing units, a plurality of storage adapters, and a plurality of network adapters. The method includes, in response to receiving a task, identifying a target storage resource and a target network resource to use to perform the task; identifying, from among the plurality of processing units, a first processing unit of a first chassis of a first node that includes processing capacity to perform the task; identifying, from among the plurality of processing units, a second processing unit of a second chassis of a second node that includes processing capacity to perform the task; determining a first storage counter that indicates a compatibility for the first processing unit to be used to perform the task by incrementing the first storage counter for each storage adapter connected to the target storage resource, incrementing the first storage counter for each storage adapter connected to the target storage resource and configured in the first node, and incrementing the first storage counter for each storage adapter connected to the target storage resource and configured in the first chassis; determining a first network counter that indicates a compatibility for the first processing unit to be used to perform the task by incrementing the first network counter for each network adapter connected to the target network resource, incrementing the first network counter for each network adapter connected to the target network resource and configured in the first node, and incrementing the first network counter for each network adapter connected to the target network resource and configured in the first chassis; determining a second storage counter that indicates a compatibility for the second processing unit to be used to perform the task by incrementing the second storage counter for each storage adapter connected to the target storage resource, incrementing the second storage counter for each storage adapter connected to the target storage resource and configured in the second node, and incrementing the second storage counter for each storage adapter connected to the target storage resource and configured in the second chassis; determining a second network counter that indicates a compatibility for the second processing unit to be used to perform the task by incrementing the second network counter for each network adapter connected to the target network resource, incrementing the second network counter for each network adapter connected to the target network resource and configured in the second node, and incrementing the second network counter for each network adapter connected to the target network resource and configured in the second chassis; generating a first host compatibility for the first processing unit to perform the task with the target storage resource and the target network resource by aggregating the first storage counter and the first network counter; generating a second host compatibility for the second processing unit to perform the task with the target storage resource and the target network resource by aggregating the second storage counter and the second network counter; selecting the first processing unit to perform the task based upon the first host compatibility being greater than the second host compatibility; and performing the task with the first processing unit.

In an alternate embodiment consistent with aspects of the invention, the workload allocation problem is addressed by a method of performing a task in a computing system of the type that includes a plurality of processing units, a plurality of storage adapters, and a plurality of network adapters distributed within a plurality of nodes. The method includes determining a storage affinity for each of the plurality of storage adapters with respect to a first processing unit among the plurality of processing units, each storage affinity indicating an affinity for the first processing unit to use a respective storage adapter to connect to a target storage resource when performing a task; determining a network affinity for each of the plurality of network adapters with respect to the first processing unit, each network affinity indicating an affinity for the first processing unit to use a respective network adapter to connect to a target network resource when performing the task; and determining a host affinity for the first processing unit to perform the task with the target storage resource and the target network resource based upon a combination of the storage affinities and the network affinities.

In another embodiment, a computing system includes a plurality of processing units, a plurality of storage adapters, and a plurality of network adapters distributed within a plurality of nodes; and program code configured to be executed by the plurality of processing units, the program code further configured to determine a storage affinity for each of the plurality of storage adapters with respect to a first processing unit among the plurality of processing units, each storage affinity indicating an affinity for the first processing unit to use a respective storage adapter to connect to a target storage resource when performing a task, determine a network affinity for each of the plurality of network adapters with respect to the first processing unit, each network affinity indicating an affinity for the first processing unit to use a respective network adapter to connect to a target network resource when performing the task, and determine a host affinity for the first processing unit to perform the task with the target storage resource and the target network resource based upon a combination of the storage affinities and the network affinities. In some embodiments, the method further includes determining a second host affinity for a second processing unit among the plurality of processing units to perform the task with the target storage resource and the target network resource based upon a combination of respective storage affinities and network affinities between the second processing unit and respective storage adapters and network adapters from among the pluralities of storage adapters and network adapters. One processing unit may be chosen to perform the task over another based on which has the higher host affinity.

In yet another embodiment, a program product may include program code configured to be executed by at least one processing unit of a plurality of processing units configured in a computing system having the plurality of processing units, a plurality of storage adapters, and a plurality of network adapters distributed within a plurality of nodes, the program code further configured to determine a storage affinity for each of the plurality of storage adapters with respect to a first processing unit among the plurality of processing units, each storage affinity indicating an affinity for the first processing unit to use a respective storage adapter to connect to a target storage resource when performing a task, determine a network affinity for each of the plurality of network adapters with respect to the first processing unit, each network affinity indicating an affinity for the first processing unit to use a respective network adapter to connect to a target network resource when performing the task, and determine a host affinity for the first processing unit to perform the task with the target storage resource and the target network resource based upon a combination of the storage affinities and the network affinities.

These and other advantages will be apparent in light of the following figures and detailed description.

BRIEF DESCRIPTION OF THE DRAWINGS

The accompanying drawings, which are incorporated in and constitute a part of this specification, illustrate embodiments of the invention and, together with a general description of the invention given above and the detailed description of the embodiments given below, serve to explain the principles of the invention.

DETAILED DESCRIPTION

Embodiments of the present invention include a method, apparatus, and program product to more efficiently allocate workload tasks among different hosts by scoring each host according to its affinity with hardware resources required for a given workload task, and allocating a workload task to a host having a high affinity.

Figure 1:
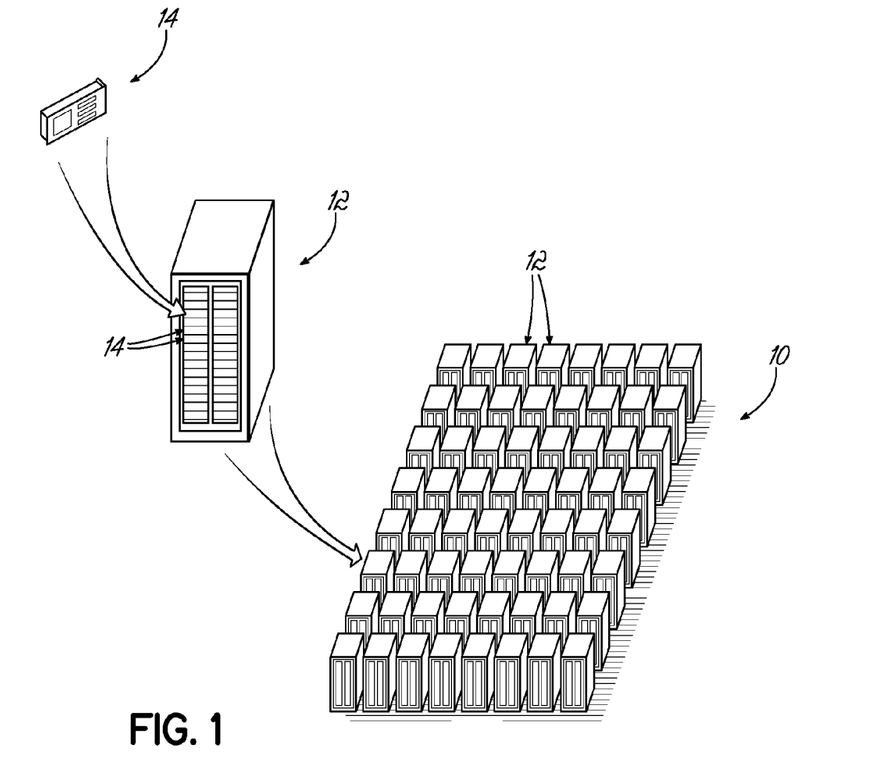
FIG. 1 is a diagrammatic illustration of an architecture of a parallel processing computing system showing the element progression from a host to a chassis to the parallel processing computing system consistent with embodiments of the invention.

Turning to the drawings, wherein like numbers may denote like parts throughout several views, FIG. 1 is a diagrammatic illustration of a parallel processing computing system 10 that includes a chassis 12 and a host 14, where the computing system 10 includes one or more chassis 12 connected to a network.

Figure 2:
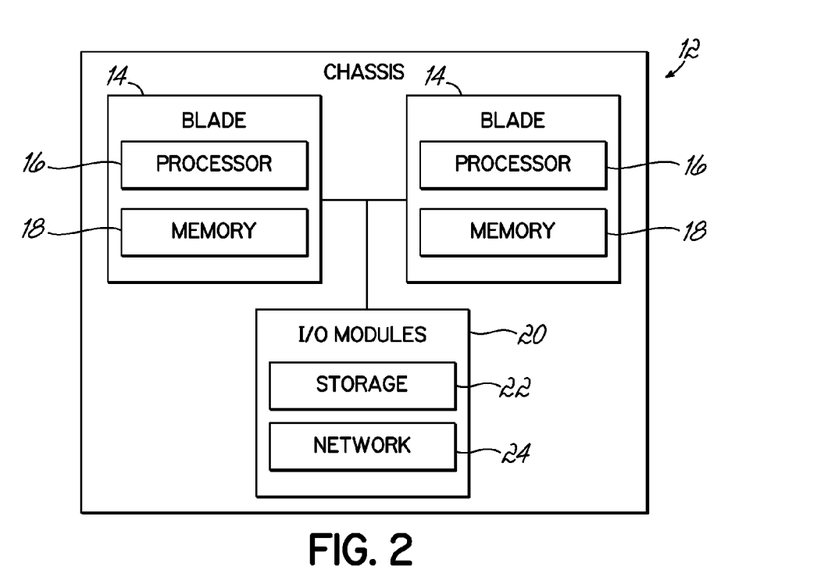
FIG. 2 is a block diagram showing the hardware and software components of one embodiment of a computer chassis consistent with the invention.

FIG. 2 is a diagrammatic illustration of a chassis 12 including one or more blade hosts 14. Each host 14 may include a processor 16 and memory 18, but the hosts may collectively share access to I/O modules 20, including one or more storage modules 22 and network modules 24 within the chassis—that is, each host 14 within the chassis 12 has direct access to the same set of I/O modules 20.

Figure 3:
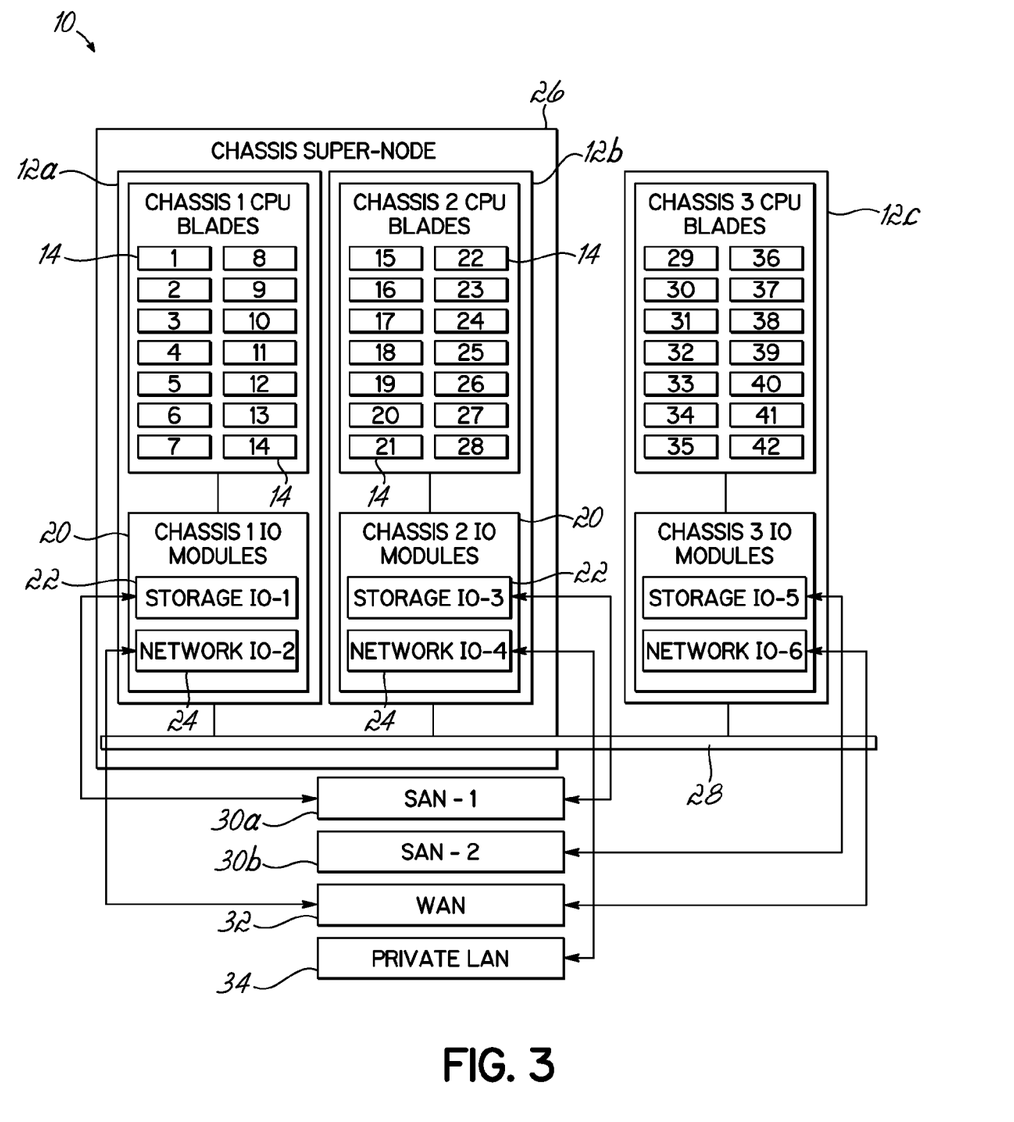
FIG. 3 is a diagrammatic illustration of an architecture of a parallel processing computing system showing the interconnection of three chassis consistent with one embodiment of the present invention.

As shown in FIG. 3, multiple chassis 12a, 12b may be grouped into a node 26, which may generally occupy physical proximity or may be interconnected in certain ways as known in the art. The grouping of chassis 12a, 12b may also be referred to as a "super-node" to distinguish it from a single host or blade which is also sometimes referred to as a computing node; however, the terms "node" and "super-node" are used interchangeably herein. In addition to the chassis 12a, 12b making up the super-node 26, other chassis 12c within the system 10 may be accessible to hosts associated with chassis 12a, 12b within the super-node 26. Thus the evaluation of resources available through dispersed-node or distant chassis 12c is contemplated within the scope of the present invention.

Chassis are connected by means of a chassis interconnect fabric 28. Heavy use of the interconnect fabric 28 may consume significant processing power, increase latency times, and create or worsen resource conflicts, especially as calls are made by more distant processes.

Chassis I/O modules 20 connect hosts 14 to external resources such as storage area networks 30a and 30b, a wide area network 32, and a local area network 34. As shown, each chassis I/O module 20 may connect uniquely to a different resource or a set of resources, because different chassis 12 may include I/O modules 20 connecting to different resources that, in order to place a workload to localize its use of I/O resources, it is advantageous to evaluate each eligible host 14 to determine where the workload may be most efficiently run.

Those skilled in the art will recognize that FIGS. 1-3 are not intended to limit the invention. In addition, although FIGS. 1-3 are a diagrammatic illustrations of one exemplary embodiment of a computing system 10 in which the hosts 14 are configured with various hardware resources characteristic of a blade server, and are therefore referred to as blades 14, it will be understood that many other types of distributed computing systems may implement processes consistent with the present invention. As such, the types and numbers of computing hosts, hardware resources, external resources, and connections are only for illustrative purposes. Hence, while the exemplary embodiment provides a particular configuration of computing hosts in an exemplary computing system, the illustration does not serve to limit the invention, but merely serves illustrative purposes. As such, as those skilled in the art recognize, any number and/or configuration of hardware resources and computing hosts may be used in an embodiment consistent with the invention.

The routines executed to implement the embodiments of the invention, whether implemented as part of an operating system or a specific application, component, program, object, module or sequence of operations executed by one or more processors of the computing system 10 will be referred to herein as "computer program code" or simply "program code." For example, referring to the computer and/or computing system of FIG. 2, the computer program code typically comprises one or more instructions that are resident at various times in various memory and/or storage devices in the computing system 10, and that, when executed by one or more processors 16 of the computing system 10, may cause the computing system to perform the steps necessary to execute steps, elements, and/or blocks embodying the various aspects of the invention. In addition, those skilled in the art will recognize that embodiments of the invention are not limited to particular types or configurations of processors or memory and/or storage devices.

While the invention has and hereinafter will be described in the context of fully functioning computing systems, those skilled in the art will appreciate that the various embodiments of the invention are capable of being distributed as a program product in a variety of forms, and that the invention applies equally regardless of the particular type of computer readable media used to actually carry out the distribution. Examples of computer readable media include, for example, non-transitory recordable type media such as volatile and nonvolatile memory devices, floppy and other removable disks, hard disk drives, USB drives, optical disks (e.g. CD-ROM's, DVD's, Blu-Ray discs, etc.), among others.

In addition various program code described hereinafter may be identified based upon the application or software component within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Those skilled in the art will recognize that the exemplary environments illustrated in FIGS. 1-3 are not intended to limit the invention. Indeed, those skilled in the art will recognize that other alternative hardware and/or software environments, and incorporating different numbers and configurations of hardware resources, may be used without departing from the scope of the invention. Those skilled in the art will also recognize that the invention contemplates all types of computing systems, including computing systems and other programmable electronic devices configured with processors, memory and/or storage devices, including, for example, client computers, server computers, portable computers, handheld computers, embedded controllers, etc.

In addition, one or more processors of the computing system may execute computer program code in one or more memory and/or storage devices of the computing system, and that the memory may represent the random access memory (RAM) devices comprising the main storage of a computer, as well as any supplemental levels of memory, e.g., cache memories, non-volatile or backup memories (e.g., programmable or flash memories), read-only memories, etc. In addition, a memory may be considered to include memory storage physically located elsewhere in a computer, e.g., any cache memory in a processor, as well as any storage capacity used as a virtual memory, e.g., as stored on a mass storage device or on another interconnected computer. In addition, those skilled in the art will recognize that the invention may be implemented on various types of parallel processing systems such as mainframes, supercomputers, etc.

Figure 4:
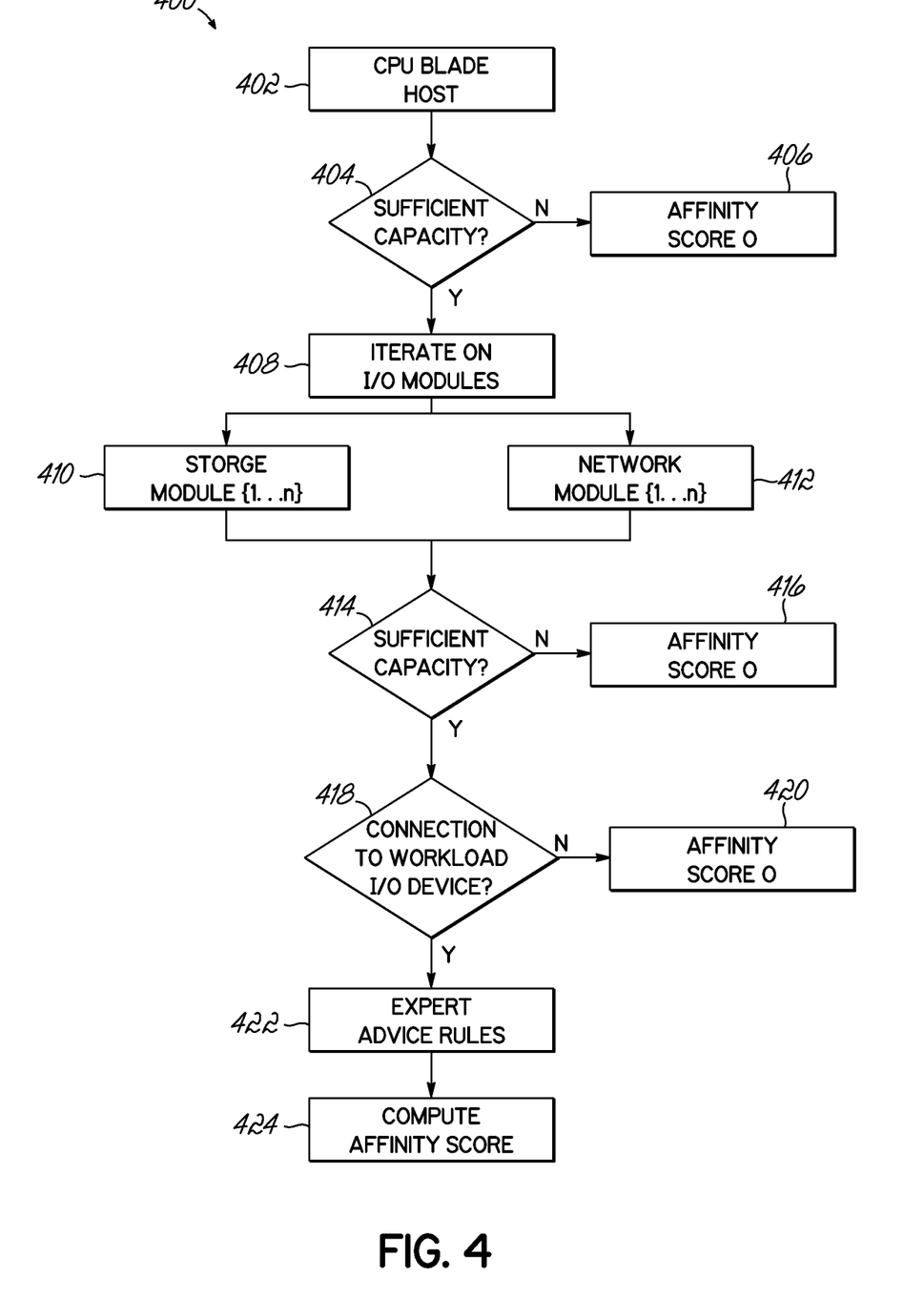
FIG. 4 is a flowchart illustrating blocks of a program code executable by a parallel processing computing system to determine host eligibility for running a workload.

As a threshold matter, a process for determining whether a given host 14 is eligible to run a workload at all is illustrated by the flowchart 400 of FIG. 4. Here, a given host 14 is selected for evaluation (block 402). First, resources internal to the host 14, such as available memory, are evaluated against the requirements of the workload; a failure ("no" branch of decision block 404) represents a "busy" host that will be scored 0 and not further considered (block 406). Should host 14 have the capacity to accommodate the workload, each module that the host 14 can access is similarly queried (blocks 408, 410, and 412). Again, the requirements of the workload are known; should the accessible modules not meet these requirements ("no" branch of block 414), then again the host 14 is scored 0 and not further considered (block 416).

Finally, the system may also limit itself to checking hosts that have a connection to the workload I/O device itself, as a further eligibility criterion to take on the workload (block 418). Failing to meet that criterion could again cause an affinity score of 0 to be assigned to the host 14 (block 420); passing that criterion may permit the host's affinity score to be calculated on the basis of the expert advice rules and associated scoring used by the process (blocks 422, 424).

Figure 5:
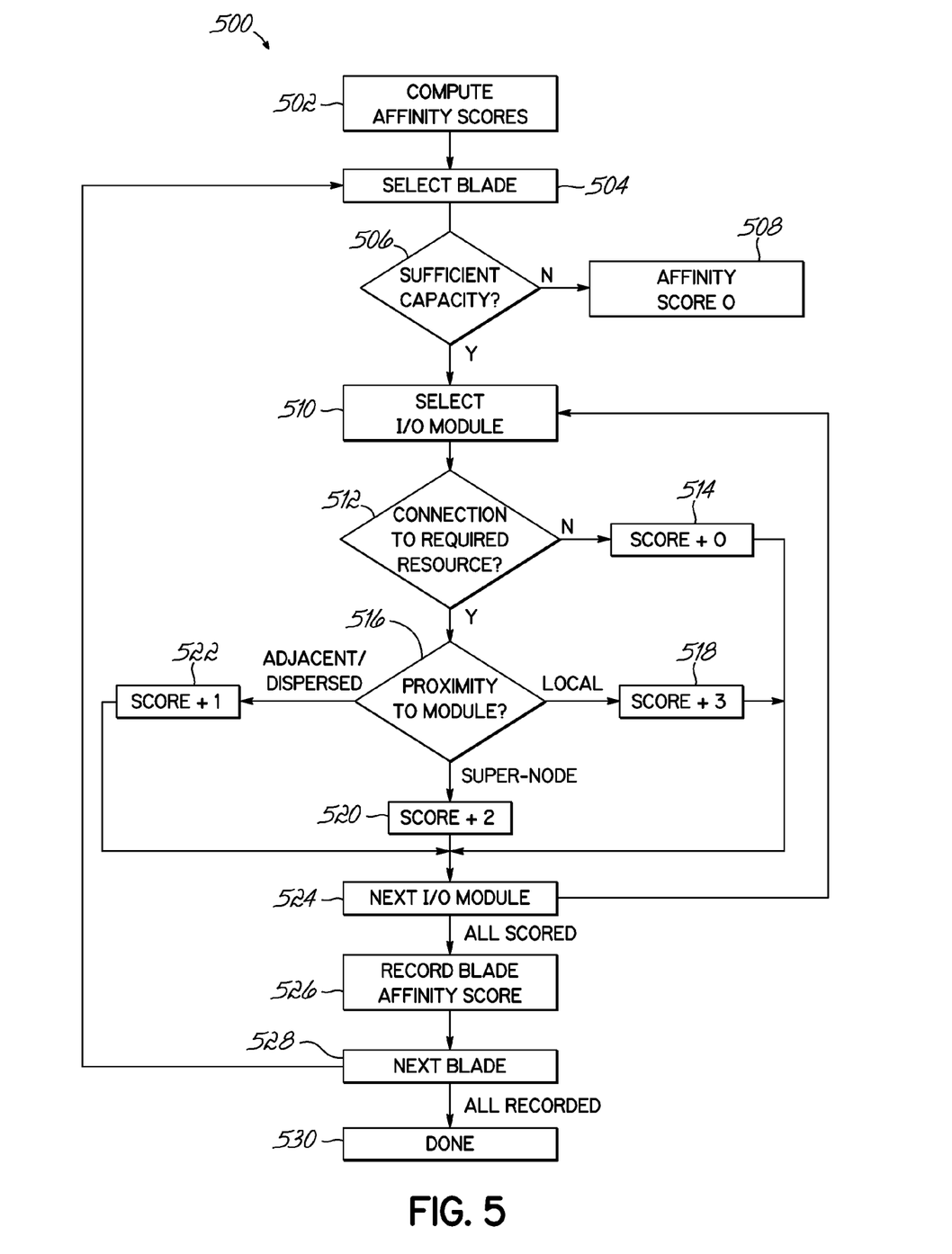
FIG. 5 is a flowchart illustrating block of program code executable by a parallel processing computing system to generate hardware affinity scores for hosts eligible to run a workload.

Under one set of expert advice rules, a process such as that illustrated by the flowchart 500 of FIG. 5 may be used. Here, in response to an automatic or manual instruction to compute affinity scores for a given workload (block 502), a first potential host is selected for evaluation (block 504). It is at this point that a threshold evaluation of host capacity may be performed (block 506), which if the host fails at any point, may result in an affinity score of zero (block 508) and iteration to the next host. This threshold evaluation may involve some or all of the evaluation steps shown in the flowchart 400 of FIG. 4 and described above.

Next, each I/O module in turn is examined to determine its availability to the host being evaluated and its relevance to the workload in order to determine the current host's affinity score. For each module (block 510), if the module is not connected to any required resource ("no" branch of block 512), then it does not improve the host's overall affinity for the workload (block 514). If the module is connected to a resource required by the workload ("yes" branch of block 512), then the proximity of the module to the host is assessed (block 516). Local resources are ideal; I/O modules 20 within the same chassis 12 as the host 14 may contribute the most to the affinity score, such as 3 points (block 518). Modules available on other chassis within the same super-node as the current host's chassis may contribute less, such as 2 points (block 520). Modules that are available to the host but are in adjacent or dispersed chassis not part of the host's chassis's super-node may contribute even less, such as 1 point (block 522). Each accessible module is evaluated in turn (block 524 to block 510), and then the total affinity score recorded (block 526). Once each host is scored (block 528 to block 504) and the scores recorded, the affinity score process is complete (block 530). One of the hosts with the highest affinity score may be selected to host the workload.

Figure 6:
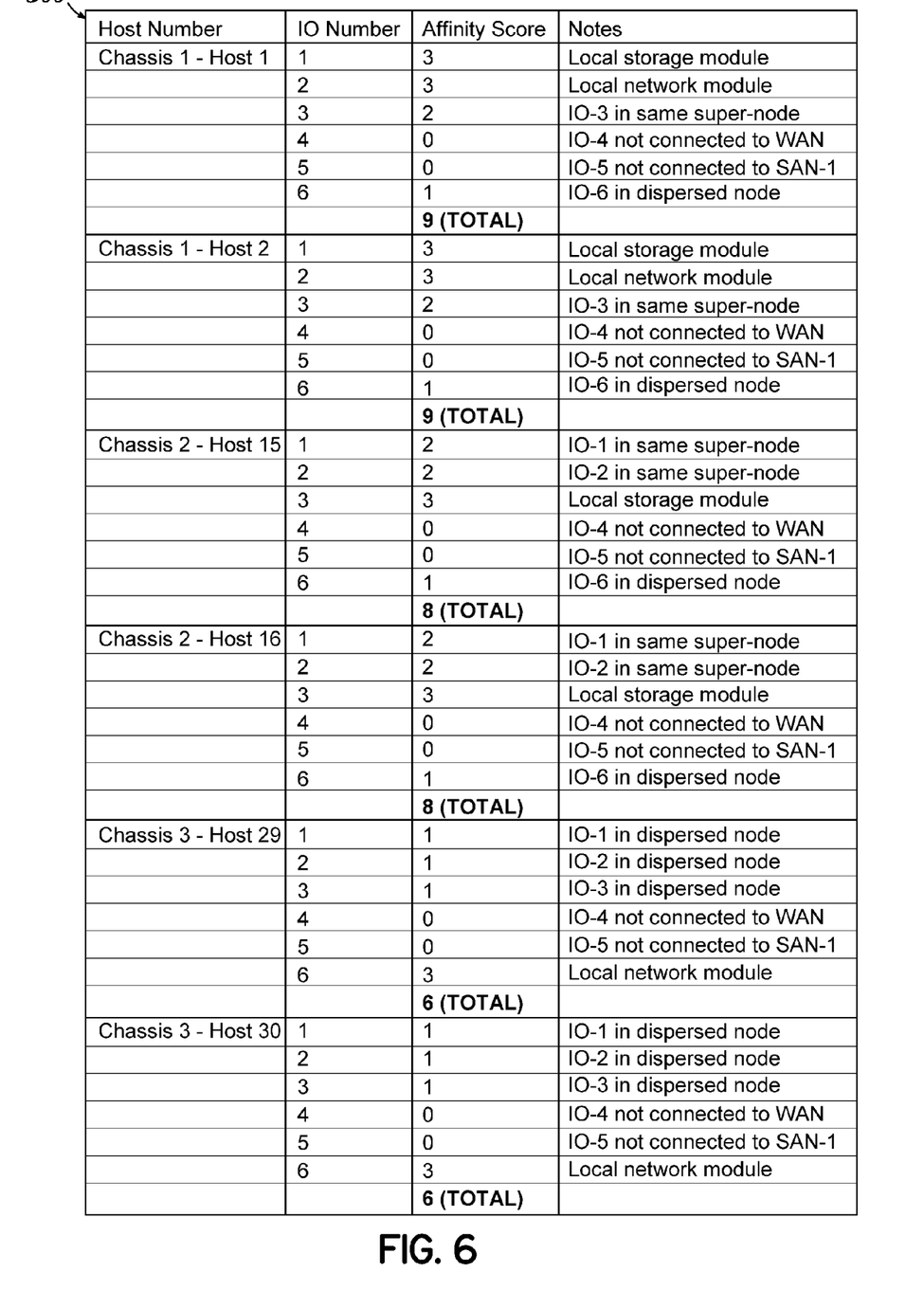
FIG. 6 is a table showing exemplary scores resulting from running the program code illustrated in the flowchart of FIG. 5 on the parallel processing computing system illustrated by FIG. 3.

An example of the scoring process as illustrated in FIG. 5 can be seen in the table 600 of FIG. 6, which reflects the evaluation of the hosts associated with the system 10 shown in FIG. 3. Each host includes a host number, from 1 to 42, and may be scored for its affinity with a given workload process.

The table 600 of FIG. 6 illustrates the scoring associated with the system 10 of FIG. 3 against a workload with a storage requirement of the SAN-1 labeled 30*a* and a network requirement of the wide area network 32. As the exemplary system 10 represents a blade server network, it will be understood that each host 14, representing one blade, will have the same affinity score as other hosts 14 within the same chassis 12. Two hosts 14 from each of the three chassis 12*a*, 12*b*, 12*c* are scored as shown in FIG. 6 for illustration.

Hosts 1 and 2 are each within the first chassis 1. They are in the same chassis 12*a* as the storage module known as IO-1 and the network module IO-2. Because IO-1 connects to a required resource, SAN-1, and is local to the hosts 14 represented by Host 1 and Host 2, each of Hosts 1 and 2 scores 3 points for IO-1. Similarly, because IO-2 connects to a required resource, WAN, and is local, IO-2 also scores 3 points for Hosts 1 and 2.

IO-3 is within a chassis 12b that is within the same super-node 26 as the Hosts 1 and 2. It connects to a required resource, SAN-1, and so Hosts 1 and 2 score 2 points for IO-3.

IO-4 and IO-5 do not connect to a required resource, and so contribute 0 points.

IO-6 belongs to a chassis 12c that is not within the same super-node 26 as the Hosts 1 and 2, but does connect to a required resource, WAN. Hosts 1 and 2 therefore score one additional point for IO-6.

Hosts 1 and 2 each score a total of 9 points from the above network modules 20, which, if this reflects their entire universe of available IO modules 20, will give each of them a final affinity score of 9.

Hosts 15 and 16 are each within the second chassis 2. They are in the same chassis 12b as IO-3, which connects to a required resource, SAN-1, scoring them 3 points. IO-1 and IO-2 are within a different chassis 12a within the same super-node 26, and each connect to a required resource, resulting in an additional 2 points for module and therefore scoring 4 points for each of the two hosts 14. IO-6 is again a distant module that contributes 1 point, and IO-4 and IO-5 again contribute no points by not connecting to required resources. Hosts 15 and 16 each score 8 points total.

For the hosts 14 named Hosts 29 and 30, all of the modules IO-1, IO-2, and IO-3 are distant. These three modules being connected to required resources therefore contribute 1 point each for a total of 3 points to each host. IO-4 and IO-5 still contribute nothing, and IO-6, because it is in the same chassis 12c as the hosts 14 and is connected to a required resource, scores 3 points. Hosts 29 and 30 score a total of 6 points.

Having determined the affinity scores for each available host 14, the hosts 14 of the first chassis 12a may preferentially host the workload over the hosts 14 of the second chassis 12b, and the hosts 14 of both chassis 12a,12b preferentially over the hosts 14 of the third chassis 12c.

Although the above proximity rules allow for simple affinity sorting, one of ordinary skill in the art will understand that further scoring systems by means of other expert rules for resource affinity may be known in the art.

From a high availability (HA) perspective, the above proximity rules take into account advantages in redundancy by increasing the score of hosts proximate to multiple I/O modules accessing the same required resource. Thus, hosts that satisfy HA requirements will also tend to have higher scores even under the simple rules used above. In situations where multiple I/O modules are located on a single chassis, accumulating points for each of the multiple modules will preference hosts with more redundancy. Where redundancy is listed as a workload requirement, a scoring process in accordance with the present invention can include that requirement in the scoring rules and subsequently deploy the workload to a host satisfying this requirements along with the workload's other requirements as described.

It will be appreciated by one having ordinary skill in the art that the embodiments disclosed above are merely exemplary and not intended to limit the scope of the present invention. As such, the embodiments disclosed above generally illustrate various ways each host 14 within the system 10 may be scored for hardware affinity with respect to a workload.

While the present invention has been illustrated by a description of the various embodiments and the examples, and while these embodiments have been described in considerable detail, it is not the intention of the applicants to restrict or in any way limit the scope of the appended claims to such detail. Additional advantages and modifications will readily appear to those skilled in the art. Thus, the invention in its broader aspects is therefore not limited to the specific details, representative apparatus and method described.

Nor is the invention in its broader aspects limited to the specific process of the flowcharts illustrated in FIGS. 4 and 5. As such, the blocks of FIGS. 4 and 5 may be re-ordered without departing from the scope of the invention. Certain steps may be combined or omitted; for example, steps 404 and 506 may represent the same step, and steps 408, 410, 412, and 414 may be redundant with the scoring process illustrated in FIG. 5. Other variations will be understood by one skilled in the art.

Furthermore, one skilled in the art will appreciate that the disclosure of the present invention is suitable to implement across a multi-computing core system. As such, it will be appreciated that the program code consistent with the present invention is configured to perform a process consistent with the invention across a plurality of computing cores, and not just the first, second, and third interconnected chassis that have been described. Additionally, one having ordinary skill in the art will appreciate that the first, second, and third chassis may be configured as part of a variety of different system architectures. Accordingly, departures may be made from such details without departing from the scope of applicants' general inventive concept.

What is claimed is:

1. A method of performing a task in a computing system of the type that includes a plurality of processing units, a plurality of storage adapters, and a plurality of network adapters distributed within a plurality of nodes, the method comprising:

in response to receiving the task:
identifying a target storage resource and a target network resource corresponding to the task from among a plurality of storage resources and network resources;
identifying one or more processing units among the plurality of processing units with sufficient capacity to perform the task, wherein each of the one or more identified processing units is connected to more than one storage adapter of the plurality of storage adapters, and each of the one or more identified processing units is connected to more than one network adapter of the plurality of network adapters;
determining a storage affinity for each of the plurality of storage adapters with respect to each of the one or more identified processing units, each storage affinity indicating an affinity for a respective processing unit to use a respective storage adapter to connect to the target storage resource when performing the task;
determining a network affinity for each of the plurality of network adapters with respect to each of the one or more identified processing units, each network affinity indicating an affinity for a respective processing unit to use a respective network adapter to connect to the target network resource when performing the task;
determining a host affinity for each of the one or more identified processing units to perform the task with the target storage resource and the target network resource based upon a combination of the storage affinities and the network affinities; and
selecting a particular processing unit from the one or more identified processing units to perform the task based at least in part on the host affinity determined for each of the identified processing units.

2. The method of claim 1, wherein the one or more identified processing units comprises a first processing unit and a second processing unit, and determining the host affinity comprises determining a first host affinity for the first processing unit and determining a second host affinity for the second processing unit.

3. The method of claim 2, wherein the first host affinity is higher than the second host affinity, and selecting the particular processing unit from the one or more identified processing units comprises:
selecting the first processing unit as the particular processing unit to perform the task based on the first host affinity being higher than the second host affinity.

4. The method of claim 1, wherein the storage affinities and the network affinities are determined in response to determining that each of the one or more identified processing units first processing units includes sufficient capacity to perform the task.

5. The method of claim 1, wherein the one or more identified processing units comprises a first processing unit, and determining the storage affinities further comprises:
determining whether each of the plurality of storage adapters is connected to the target storage resource; and
increasing a first storage affinity for a first storage adapter among the plurality of storage adapters when the first storage adapter is connected to the target storage resource.

6. The method of claim 5, further comprising:
determining whether the first storage adapter is configured on the same node as the first processing unit; and
increasing the first storage affinity for the first storage adapter when the first storage adapter is configured on the same node as the first processing unit.

7. The method of claim 5, wherein the nodes are distributed across a plurality of chassis, the method further comprising:
determining whether the first storage adapter is configured in the same chassis as the first processing unit; and
increasing the first storage affinity for the first storage adapter when the first storage adapter is configured on the same chassis as the first processing unit.

8. The method of claim 1, wherein determining the storage affinities further comprises:
clearing a first storage affinity for a first storage adapter among the plurality of storage adapters when the first storage adapter is not connected to the target storage resource.

9. The method of claim 1, wherein the one or more identified processing units comprises a first processing unit, and determining the network affinities further comprises:
determining whether each of the plurality of network adapters is connected to the target network resource; and
increasing a first network affinity for a first network adapter among the plurality of network adapters when the first network adapter is connected to the target network resource.

10. The method of claim 9, further comprising:
determining whether the first network adapter is configured on the same node as the first processing unit; and
increasing the first network affinity for the first network adapter when the first network adapter is configured on the same node as the first processing unit.

11. The method of claim 9, wherein the nodes are distributed across a plurality of chassis, the method further comprising:
determining whether the first network adapter is configured in the same chassis as the first processing unit; and
increasing the first network affinity for the first network adapter when the first network adapter is configured on the same chassis as the first processing unit.

12. The method of claim 1, wherein determining the network affinities further comprises:
clearing a first network affinity for a first network adapter among the plurality of network adapters when the first network adapter is not connected to the target network resource.

13. The method of claim 1, wherein the storage affinities and the network affinities are determined prospectively to performance of the task.

14. A computing system, comprising:
a plurality of processing units, a plurality of storage adapters, and a plurality of network adapters distributed within a plurality of nodes; and
program code configured to be executed by the plurality of processing units, the program code further configured to:
responsive to receiving a task:
identify a target storage resource and a target network resource corresponding to a task from among a plurality of storage resources and network resources;
identify one or more processing units among the plurality of processing units with sufficient capacity to perform the task, wherein each of the one or more identified processing units is connected to more than one storage adapter of the plurality of storage adapters, and each of the one or more identified processing units is connected to more than one network adapter of the plurality of network adapters,
determine a storage affinity for each of the plurality of storage adapters with respect to each of the one or more identified processing units, each storage affinity indicating an affinity for a respective processing unit to use a respective storage adapter to connect to the target storage resource when performing the task,
determine a network affinity for each of the plurality of network adapters with respect to each of the one or more identified processing units, each network affinity indicating an affinity for a respective processing unit to use a respective network adapter to connect to the target network resource when performing the task,
determine a host affinity for each of the one or more identified processing units to perform the task with the target storage resource and the target network resource based upon a combination of the storage affinities and the network affinities; and
select a particular processing unit from the one or more identified processing units to perform the task based at least in part on the host affinity determined for each of the identified processing units.

15. The computing system of claim 14, wherein the one or more identified processing units comprises a first processing unit and a second processing unit, the determined host affinity for the first processing unit is a first host affinity, and the determined host affinity for the second processing unit is a second host affinity.

16. The computing system of claim 15, wherein the first host affinity is higher than the second host affinity, and the program code is configured to select the particular processing unit to perform the task by:

selecting the first processing unit as the particular processing unit to perform the task based on the first host affinity being higher than the second host affinity.

17. The computing system of claim 14, wherein the one or more identified processing units comprises a first processing unit, and the program code determines the storage affinities by:
   determining whether each of the plurality of storage adapters is connected to the target storage resource; and
   increasing a first storage affinity for a first storage adapter among the plurality of storage adapters when the first storage adapter is connected to the target storage resource.

18. The computing system of claim 17, wherein the program code is further configured to:
   determine whether the first storage adapter is configured on the same node as the first processing unit; and
   increase the first storage affinity for the first storage adapter when the first storage adapter is configured on the same node as the first processing unit.

19. The computing system of claim 17, wherein the nodes are distributed across a plurality of chassis, and the program code is further configured to:
   determine whether the first storage adapter is configured in the same chassis as the first processing unit; and
   increase the first storage affinity for the first storage adapter when the first storage adapter is configured on the same chassis as the first processing unit.

20. The computing system of claim 14, wherein the one or more identified processing units comprises a first processing unit, and the program code is configured to determine the network affinities by:
   determining whether each of the plurality of network adapters is connected to the target network resource; and
   increasing a first network affinity for a first network adapter among the plurality of network adapters when the first network adapter is connected to the target network resource.

21. The computing system of claim 20, wherein the program code is further configured to:
   determine whether the first network adapter is configured on the same node as the first processing unit; and
   increase the first network affinity for the first network adapter when the first network adapter is configured on the same node as the first processing unit.

22. The computing system of claim 20, wherein the nodes are distributed across a plurality of chassis, and the program code is further configured to the method further comprising:
   determine whether the first network adapter is configured in the same chassis as the first processing unit; and
   increase the first network affinity for the first network adapter when the first network adapter is configured on the same chassis as the first processing unit.

23. The computing system of claim 14, wherein the storage affinities and the network affinities are determined prospectively to performance of the task.

24. A program product, comprising:
   a non-transitory computer readable medium including program code configured to be executed by at least one processing unit of a plurality of processing units configured in a computing system having the plurality of processing units, a plurality of storage adapters, and a plurality of network adapters distributed within a plurality of nodes, the program code further configured to:
      responsive to receiving a task:
         identify a target storage resource and a target network resource corresponding to a task from among a plurality of storage resources and network resources;
         identify one or more processing units among the plurality of processing units with sufficient capacity to perform the task, wherein each of the one or more identified processing units is connected to more than one storage adapter of the plurality of storage adapters, and each of the one or more identified processing units is connected to more than one network adapter of the plurality of network adapters,
         determine a storage affinity for each of the plurality of storage adapters with respect to each of the one or more identified processing units, each storage affinity indicating an affinity for a respective processing unit to use a respective storage adapter to connect to the target storage resource when performing the task,
         determine a network affinity for each of the plurality of network adapters with respect to each of the one or more identified processing units, each network affinity indicating an affinity for a respective processing unit to use a respective network adapter to connect to the target network resource when performing the task,
         determine a host affinity for each of the one or more identified processing units to perform the task with the target storage resource and the target network resource based upon a combination of the storage affinities and the network affinities; and
      select a particular processing unit from the one or more identified processing units to perform the task based at least in part on the host affinity determined for each of the identified processing units.

25. A method of performing a task in a computing system of the type that includes a plurality of processing units, a plurality of storage adapters, and a plurality of network adapters distributed within a plurality of nodes, the method comprising:
   identifying a target storage resource and a target network resource corresponding to the task from among a plurality of storage resources and network resources;
   identifying each processing unit of the plurality including processing capacity to perform the task, wherein each of the one or more identified processing units is connected to more than one storage adapter of the plurality of storage adapters, and each of the one or more identified processing units is connected to more than one network adapter of the plurality of network adapters;
   for each respective identified processing unit:
      determining a respective storage affinity for each of the plurality of storage adapters with respect to the respective identified processing unit, each storage affinity indicating an affinity for the respective identified processing unit to use the respective storage adapter to connect to the target storage resource when performing the task, wherein the respective storage affinity is based at least in part on whether the respective storage adapter is connected to the target storage resource,
      determining a respective network affinity for each of the plurality of network adapters with respect to the respective identified processing unit, each network affinity indicating an affinity for the respective identified processing unit to use the respective storage adapter to connect to the target network resource when performing the task, wherein the respective network affinity is based at least in part on whether the respective network adapter is connected to the target network resource, determining a respective host affinity for each respective identified processing unit to perform the task with the target storage resource and the target network resource based upon a combination of the storage affinities and network affinities;

selecting a particular processing unit of the respective identified processing units based at least in part on the respective host affinity of each respective identified processing unit; and performing the task with the particular processing unit.

* * * * *